United States Patent Office 2,737,530
Patented Mar. 6, 1956

2,737,530

UNSATURATED FLUORO ETHERS AND FLUORO ORTHO ESTERS AND THEIR PRODUCTION

Robert P. Ruh, Midland, Mich., assignor to The Dow Chemical Company, Midland, Mich., a corporation of Delaware No Drawing. Application June 2, 1950,
Serial No. 165,871

2 Claims. (Cl. 260—615)

This invention relates to the production of fluoro-substituted organic compounds, and, more particularly, to the production of such compounds by a reaction involving a fluoro-substituted ethylene and a hydroxy-hydrocarbon.

U. S. Patent 2,409,274, issued to Hanford and Rigby on October 15, 1946 discloses the production of polyfluoro organic ethers from "polyfluoroethylenes containing at least three halogen atoms," and requires that the "polyfluoroethylenes" have the "general formula $CF_2=CX_2$, where one X is selected from the group consisting of hydrogen and halogen and the other X is halogen." The method of Hanford and Rigby produces only saturated ethers, and involves, apparently, a simple addition reaction illustrated by Example 1 of their patent, which shows the addition of ethyl alcohol to tetrafluoroethylene to produce 1,1,2,2-tetrafluoroethyl ethyl ether.

The present invention is based upon the discovery that fluorine-containing unsaturated ethers and fluorine-containing ortho esters are produced by an entirely different reaction which proceeds with related, but significantly different, starting materials.

According to the invention a fluoro-substituted aliphatic compound is produced from a polyhalo-ethylene and an acyclic hydroxy-hydrocarbon having not more than four carbon atoms. The polyhalo-ethylene that is used has from three to four halo substituents of atomic weight less than 80, including one fluorine attached to each carbon atom. The reaction of the invention is conducted in the presence of a base.

The fluoro-substituted polyhalo-ethylene aliphatic compounds that are produced have the general formula

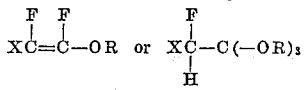

in which X represents hydrogen or a halogen of atomic weight between 35 and 80, and R is the residue formed by the removal of one hydroxyl group from an acyclic hydroxy-hydrocarbon. Ortho esters and unsaturated ethers represented by the above formulas are believed to be new compositions of matter.

Ethers and ortho esters produced according to the process of the invention show promise as fumigants, and ethers as polymerizable materials.

The over-all reaction that proceeds according to the method of the invention is illustrated by Equation 1, below, which shows the production of 2-chloro-1,2-difluorovinyl ethyl ether from 1,2-dichloro-1,2-difluoroethylene and ethyl alcohol, in the presence of potassium hydroxide:

(1)
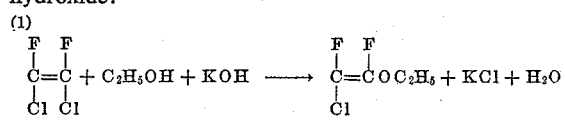

The mechanism of the reaction of the invention is not understood; although the hypothesis of an addition followed by a dehydrohalogenation explains the experimental results, attempts to isolate any addition product have been unsuccessful. So far as is known, if the reaction proceeds under a given set of circumstances it produces the unsaturated ether or the ortho ester, but no intermediate product.

The reaction of the invention proceeds readily at room temperature, but elevated temperatures may be used if desired. For example, the reaction may be carried out at about 20° C., and has been conducted in a bomb at a temperature as high as about 120° C. Either higher or lower temperatures may be employed, if desired, but are ordinarily not practical.

As has been hereinbefore indicated, the polyhaloethylene that is used has from three to four halo substituents of atomic weight less than 80, including one fluorine attached to each carbon atom. This term defines four known polyhaloethylenes, namely 1-bromo-1,2-difluoroethylene, 1-chloro-1,2-difluoro-ethylene, 1,2-dichloro-1,2-difluoroethylene and 1,2-dibromo-1,2-difluoroethylene. The fifth compound (namely the chlorobromo-substituted material) included within the definition of the polyhaloethylenes, is produced from 1-chloro-1,2-difluoroethylene by bromination thereof and dehydrobromination in the presence of potassium hydroxide.

Polyhalo-ethylene starting materials may be either liquids or gases under the conditions used for the reaction of the invention. In either case, the reaction may be carried out either in an open vessel or by adding the three starting materials to a pressure vessel. When an open vessel is used the polyhalo-ethylene is added to the hydroxy-hydrocarbon, and reaction then proceeds at about room temperature, or at a temperature as high as that of reflux, if desired. When the reaction is carried out in a closed vessel it is conducted at a temperature as high as about 120° C., or as low as about room temperature. When a closed vessel is used to conduct the reaction, there is ordinarily no reason to use a pressure higher than about 100 pounds per square inch gauge, and it is usually preferred to conduct the reaction at a pressure not higher than about 50 pounds per square inch gauge. The reaction is conveniently carried out at atmospheric pressure.

In general, the reaction of the invention is conducted for a period of time sufficiently long that it is substantially complete under the conditions employed. The endpoint is conveniently determined by withdrawing periodic samples of liquid from the reaction vessel and titrating to determine alkalinity. Since an acid is released thereby, the reaction of the invention is substantially complete when successive samples show no variation in alkalinity. The reaction time that is preferred in a given case depends upon the reactants employed, the amounts thereof, the temperature and pressure used, and other variables. Ordinarily it is desired, when a temperature of about 100° C. is used, to continue the reaction for from two to about ten hours to assure complete reaction, although no bad effect results if a longer reaction time is employed. In particular instances the reaction may be substantially complete in a few minutes. Ordinarily, carrying out the reaction for from six to eight hours is practicable. When a reaction temperature of about 20° C. is used, it is ordinarily desired to carry out the reaction for from about 2 to about 100 hours, and it is usually practicable to continue the reaction for from 40 to 60 hours.

As is hereinbefore indicated, the reaction of the invention is conducted in the presence of a base. It is usually preferred that the base be provided in the from of an alkali metal, an alkali metal hydroxide, or a salt formed from an alkali metal and an acyclic hydroxy-hydrocarbon having not more than four carbon atoms. The amount of base that is used to carry out the reaction of the invention depends upon the product to be made, i. e., depends upon whether an unsaturated ether or an ortho ester is to be produced. In any event it is advantageous to use at least about one mol of the base per mol of the polyhalo-ethylene, and, when an ortho ester is to be produced, it is desirable to use at least about two mols of the base per mol of the polyhalo-ethylene. It is usually preferred to use at least about a 20 per cent excess of the base over the mol ratios indicated. Ordinarily there is no reason to use more than about two mols of the base per mol of the polyhalo-ethylene to produce an unsaturated ether, or to use more than about four mols of the base per mol of the polyhalo-ethylene to produce an ortho ester. It is usually preferred to use not more than about one and one-half mols of the base per mol of the polyhalo-ethylene to produce an unsaturated ether, or to use more than about three mols of the base per mol of polyhalo-ethylene to produce an ortho ester.

The acyclic hydroxy-substituted hydrocarbons that are used in the practice of the invention have not more than four carbon atoms, and are simple aliphatic alcohols having not more than one olefinic double bond, and no non-ethylenic unsaturation, or gycols, or glycerine. Examples of acyclic hydroxy-substituted hydrocarbons include methyl alcohol, ethyl alcohol, propyl alcohols, butyl alcohols, allyl alcohol, methallyl alcohol, ethylene glycol, propylene glycols, butylene glycols, and glycerine.

If the reaction of the invention proceeds to produce an unsaturated ether (Equation 1, above) the polyhalo-ethylene and the hydroxy-hydrocarbon participate in the reaction in a 1:1 molar ratio. If, on the other hand, the reaction proceeds to produce an ortho ester the polyhalo-ethylene and the hydroxy-hydrocarbon participate in the reaction in a 1:3 molar ratio. The proportion of the hydroxy-hydrocarbon used depends upon the product to be produced. Ordinarily it is desirable to use approximately the amount required to complete the desired reaction. The reaction proceeds, however, either with a substantial excess (as much as tenfold excess) or with a deficiency (e. g., as little as about one-fourth mol of the hydroxy-hydrocarbon per mol of the polyhalo-ethylene).

In the practice of the invention it is not essential that the polyhalo-ethylene be the starting materal actually employed; this material can be produced by the dehydrohalogenation of a saturated compound, and such dehydrohalogenation can be conducted in a vessel containing sufficient amounts of a base and a hydroxy-hydrocarbon for the reaction of the invention, in addition to a sufficient amount of a base for the dehydrohalogenation; the ortho ester or the unsaturated ether of the invention is the product recovered.

The following examples illustrate preferred embodiments, but are not to be construed as limiting the invention.

*Example 1*

A fluoro-substituted aliphatic compound is produced from a polyhalo-ethylene and an acyclic hydroxy-hydrocarbon according to the following procedure:

A mixture of 1,2-dichloro-1,2-difluoroethylene (66.5 grams), metallic sodium (13.8 grams) and ethanol (180 cc.) was placed in a bomb, and was heated at 100° C. for 36 hours. The reaction products were cooled, and the excess ethyl alcohol present was dissolved in water; the organic layer was separated, dried over calcium chloride and fractionated. Unreacted 1,2-dichloro-1,2-difluoroethylene (15 grams), 2-chloro-1,2-difluorovinyl ethyl ether (19.4 grams; boiling point 81.0° C. at 753 mm. Hg; $n_D^{25}$ 1.3701; density $4°^{25°}$ 1.2018; molecular refraction 26.64) and the new compond triethyl chlorofluoro-ortho-acetate (15.5 grams; boiling point 181.0° C. at 747 mm. Hg; $n_D^{25°}$ 1.4057; density $4°^{25°}$ 1.0774; molecular refraction 48.77) were recovered.

*Example 2*

A procedure similar to that described in the preceding paragraph (except that the reaction was carried out for 65 hours at about 250° C.) was employed to produce trimethyl chlorofluoro-ortho-acetate from 1,2-dichloro-1,2-difluoroethylene (102 grams), methanol (250 cc.) and commercial sodium methylate (112 grams). After reaction was complete (i. e., after a 65 hour period) low boiling organic matter was distilled by applying vacuum to the bomb, and the materal remaining was washed with dilute hydrochloric acid. The resulting mixture was shaken for about one hour, after which the organic layer was separated, washed again with water, and dried with calcium chloride. The acid wash hydrolyzed the trimethyl chlorofluoro-ortho-acetate formed by the reaction of the invention to methyl chlorofluoroacetate (12.5 grams). This ester has a normal boiling point of 113° C. at 750 mm. Hg; $n_D^{25}$ 1.3891; density at 25° C. 1.3172 grams per cc.; molecular refraction 22.61: theory 22.42.

I claim:

1. A method of producing a fluoro-substituted compound of the class consisting of fluoro-ortho esters and unsaturated 1.2-difluoro ethers which comprises mixing together (a) one mole of a halo-1.2-difluoro ethylene containing only two carbon atoms and two fluorine atoms per molecule, and containing from one to two halogens of atomic weight between 35 and 80, (b) at least one mole of an acyclic hydroxy-hydrocarbon having not more than four carbon atoms per molecule, and (c) and at least one mole of a base of the group consisting of alkali metal hydroxides, alkali metals, and alkali metal salts of acyclic hydroxy hydrocarbons having not more than four carbon atoms per molecule, maintaining the mixture at a temperature between 20° and 120° C. for a time sufficient to insure substantial reaction, and separating the fluoro-substituted compound aforesaid from the reaction product.

2. A method of producing a fluoro-substituted ortho ester which comprises mixing together (a) one mole of a halo-1.2-difluoroethylene containing only two carbon atoms and two fluorine atoms per molecule and containing from one to two halogens of atomic weight between 35 and 80, (b) at least three mols of an acyclic monohydroxyhydrocarbon having not more than four carbon atoms, and (c) from two to four mols of a base of the group consisting of alkali metal hydroxides, alkali metals, and alkali metal salts of acyclic monohydroxyhydrocarbons having not more than four carbon atoms, maintaining the mixture at a temperature between 20° and 120° C. for a time sufficient to insure substantial reaction, and separating the resulting fluoro-substituted ortho ester from the reaction product.

References Cited in the file of this patent

UNITED STATES PATENTS

| | | |
|---|---|---|
| 2,409,274 | Hanford et al. | Oct. 15, 1946 |
| 2,433,844 | Hanford | Jan. 6, 1948 |
| 2,477,342 | McBee et al. | July 6, 1949 |
| 2,574,649 | McBee et al. | Nov. 13, 1951 |

OTHER REFERENCES

Beilstein: "Handbuch der Org. Chim.," vol. 1 (1918) page 725.

Beilstein: "Handbuch der Org. Chim.," vol. 1 (1941) page 780.

McBee et al.: "Fluorinated Ethers," Industrial & Eng. Chem. vol. 39, No. 3, pgs. 412–415.

Bolt: "The Preparation of Certain Fluorochlorohydrocarbons and Their Derivatives," A Doctoral Thesis, Purdue University, June 1944 (pgs. 1–10 of the abstract plus 2 title pages).

Richter Organic Chem. vol. 1, Nordeman Publ. Co. Inc., New York 1944, page 158.

Fieser & Fieser Organic Chemistry, Heath & Co., Boston 1944, page 152.

Park et al.: Journal of American Chem. Soc., vol. 70, April 1948, pgs. 1550–1552.